US011906909B2

(12) United States Patent
Yamoto et al.

(10) Patent No.: US 11,906,909 B2
(45) Date of Patent: Feb. 20, 2024

(54) DEVELOPING ROLLER OF ELECTROPHOTOGRAPHIC DEVICE WITHOUT PRONE TO SCUMMING IN A NONPRINTING AREA

(71) Applicant: BANDO CHEMICAL INDUSTRIES, LTD., Hyogo (JP)

(72) Inventors: Taku Yamoto, Hyogo (JP); Kimiya Goto, Hyogo (JP); Hideki Norisada, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/606,453

(22) PCT Filed: Jun. 30, 2020

(86) PCT No.: PCT/JP2020/025603
§ 371 (c)(1),
(2) Date: Oct. 26, 2021

(87) PCT Pub. No.: WO2021/006106
PCT Pub. Date: Jan. 14, 2021

(65) Prior Publication Data

US 2022/0197182 A1 Jun. 23, 2022

(30) Foreign Application Priority Data

Jul. 9, 2019 (JP) ................................ 2019-127777

(51) Int. Cl.
*G03G 15/08* (2006.01)

(52) U.S. Cl.
CPC ..... *G03G 15/0818* (2013.01); *G03G 15/0808* (2013.01)

(58) Field of Classification Search
CPC ....................... G03G 15/0808; G03G 15/0818
See application file for complete search history.

(56) References Cited

U.S. PATENT DOCUMENTS 6,397,032 B1 * 5/2002 Sakaizawa ......... G03G 15/0818 399/286
2004/0190922 A1 9/2004 Nakagawa et al.

FOREIGN PATENT DOCUMENTS

| | | |
|---|---|---|
| CN | 1519661 | 8/2004 |
| JP | H0736274 | 2/1995 |
| JP | H08328382 | 12/1996 |
| JP | H11338243 | 12/1999 |
| JP | 2001117351 | 4/2001 |

(Continued)

OTHER PUBLICATIONS

"International Search Report (Form PCT/ISA/210) of PCT/JP2020/025603", dated Sep. 8, 2020, with English translation thereof, pp. 1-6.

(Continued)

*Primary Examiner* — Joseph S Wong
(74) *Attorney, Agent, or Firm* — JCIPRNET

(57) ABSTRACT

The purpose of the present invention is to provide a developing roller which is not prone to scumming in a nonprinting area. The solution is to provide a developing roller which has an elastic layer, a coat layer formed on the elastic layer, and end portion coat layers formed on outermost surfaces on two axial end portions, wherein the end portion coat layer contains a conductive material.

7 Claims, 2 Drawing Sheets

(56) References Cited

FOREIGN PATENT DOCUMENTS

| | | |
|---|---|---|
| JP | 2005266501 | 9/2005 |
| JP | 2011017968 | 1/2011 |
| JP | 2011137914 | 7/2011 |
| JP | 4803771 | 10/2011 |
| JP | 2014074750 | 4/2014 |
| JP | 2015118276 | 6/2015 |
| JP | 2015232723 | 12/2015 |

OTHER PUBLICATIONS

"Written Opinion of the International Searching Authority (Form PCT/ISA/237) of PCT/JP2020/025603", dated Sep. 8, 2020, with English translation thereof, pp. 1-12.
"Search Report of Europe Counterpart Application", dated Jun. 1, 2023, pp. 1-9.
"Office Action of China Counterpart Application", dated Dec. 26, 2023, with English translation thereof, p. 1-p. 16.
Junmei Qi et al., "Research progress on toner analysis methods", Tianjin Chemical Industry, vol. 32, Jan. 2018, pp. 1-5.
Song Tao, "Epson thermal printer circuit analysis and troubleshooting", Electronic world, Jun. 2012, pp. 1-3.

* cited by examiner

DEVELOPING ROLLER OF ELECTROPHOTOGRAPHIC DEVICE WITHOUT PRONE TO SCUMMING IN A NONPRINTING AREA

CROSS-REFERENCE TO RELATED APPLICATION

This application is a 371 application of the international PCT application serial no. PCT/JP2020/025603, filed on Jun. 30, 2020, which claims the priority benefit of Japan Patent Application No. 2019-127777, filed on Jul. 9, 2019. The entirety of each of the above-mentioned patent applications is hereby incorporated by reference herein and made a part of this specification.

TECHNICAL FIELD

The present invention relates to a developing roller used in an electrophotographic device such as a printer, a copier, or the like.

RELATED ART

An electrophotographic device is always required to have a long life and high image quality. The electrophotographic device is configured by many members such as a photoconductor drum, a developing roller, a developing blade and the like, and various characteristics of respective members affect the long life and high image quality. Among these members, the developing roller is required to have excellent wear resistance and to stably secure toner charge imparting and toner carrying performance until cartridge replacement. In particular, the developing roller has a problem of scraping at two axial end portions of the roller which are worn by rubbing against a toner seal material, and thus a developing roller is proposed in which wear resistance at the two axial end portions is improved by some kind of end portion treatment. For example, Patent literature 1 proposes a developing roller in which a wear resistance coating film made of Teflon (registered trademark) and the like is formed on peripheral surfaces of two ends, Patent literature 2 proposes a developing roller in which a coat layer containing finely powdered polymethylsilsesquioxane is formed at least at two end portions of an outermost layer, and Patent literature 3 proposes a developing roller in which an end portion coat layer treated using isocyanate or thermoplastic urethane as an end portion treating agent is arranged at a part in contact with the seal.

However, in the electrophotographic device using a developing roller subjected to the above-described end portion treatment, when printing is repeated, scumming to which a small amount of toner adheres may occur at the peripheral edge portion of the paper, which is a nonprinting area where toner should not adhere.

The scumming in the nonprinting area is generated when toner adheres to two end portions of the developing roller (a part of the printing paper corresponding to the nonprinting area) and is transferred. As a result of diligent research by the present inventors, it is found that the cause of the scumming in the nonprinting area is that, because a coating liquid used for the end portion treatment of the developing roller contains an insulating material, when the end portion coat layer is coated by spray coating, the scattering of droplets, impregnation of the coating liquid, and the like occur, the electrical resistance value of the part adjacent to the part where the end portion treatment of the developing roller is performed (the part of the printing paper corresponding to the nonprinting area) becomes large, and toner easily adheres. Besides, because the electrical resistance value in this part is increased, the toner is overcharged, and the overcharged toner moves to the nonprinting area of the photoconductor and then to the nonprinting area of the printing paper, resulting in scumming.

Literature of Related Art

Patent Literature

Patent literature 1: Japanese Patent Laid-Open No. H08-328382
Patent literature 2: Japanese Patent Laid-Open No. H11-338243
Patent literature 3: Japanese Patent Laid-Open No. 2014-07450

SUMMARY

Problems to be Solved

The purpose of the present invention is to provide a developing roller which is not prone to scumming in a nonprinting area.

Means to Solve Problems

The means to solve the above-described problems are as follows.

1. A developing roller, having an elastic layer, a coat layer formed on the elastic layer, and end portion coat layers formed on outermost surfaces on two axial end portions, wherein
the end portion coat layer contains a conductive material.

2. The developing roller according to 1., wherein the conductive material is an ionic conductive agent.

3. The developing roller according to 1. or 2., wherein the elastic layer uses thermosetting polyurethane as a main raw material.

4. The developing roller according to any one of 1. to 3., wherein a ratio (Ω1/Ω2) of a resistance value Ω1 at an axial central part of the end portion coat layer to a resistance value Ω2 at an axial central part of the coat layer is 1.6 or less.

5. The developing roller according to any one of 1. to 4., wherein an absolute value (|Ω1−Ω2|) of a difference between the resistance value Ω1 at the axial central part of the end portion coat layer and the resistance value Ω2 at the axial central part of the coat layer is 0.7 GΩ or less.

6. An electrophotographic device, including the developing roller according to any one of 1. to 5.

Effect

In the developing roller of the present invention, the end portion coat layer contains a conductive material, and thereby the increase in the electrical resistance value is suppressed in the part adjacent to the end portion coat layer, and thus the toner does not easily adhere and the scumming is unlikely to occur in the nonprinting area. The developing roller of the present invention in which the conductive material is an ionic conductive agent enables uniform end portion coating treatment and has excellent wear resistance in the end portion coat layer.

DESCRIPTION OF THE EMBODIMENTS

Figure 1:
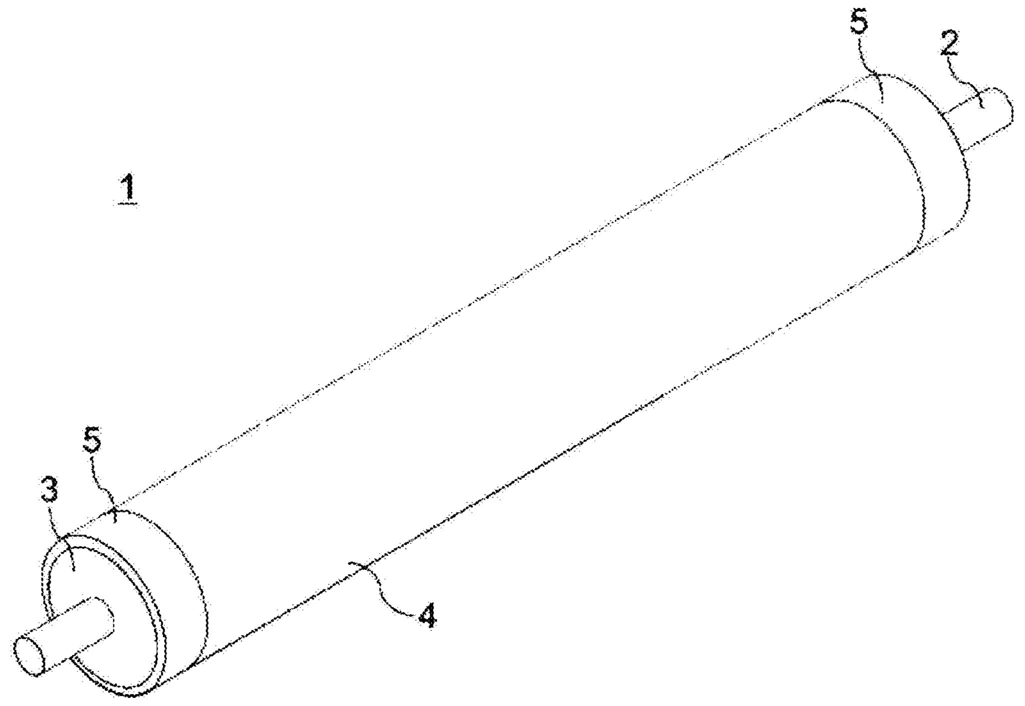
FIG. 1 is a diagram showing an embodiment of a developing roller of the present invention.

FIG. 1 shows an embodiment of a developing roller of the present invention.

A developing roller 1 which is an embodiment has a shaft 2, an elastic layer 3, a coat layer 4 formed on the elastic layer 3, and end portion coat layers 5 formed on an outermost surface on two axial end portions. The end portion coat layer 5 contains a conductive material.

(Shaft)

The shaft 2 is a shaft that rotatably supports the developing roller. One end or two ends of the shaft can be subjected to precision processing for meshing with drive components such as a toothed belt and the like. In addition, the shaft can also be rotatably supported by a plain bearing or a ball bearing. The material for forming the shaft may be any material having conductivity, and metal is preferably used. As the metal, for example, iron, copper, aluminum alloy, stainless steel, nickel, and the like are preferably used. In addition, articles obtained by subjecting the metals to plating treatment by a method such as hot-dip plating, electrolytic plating, electroless plating, or the like can be used.

(Elastic Layer)

The elastic layer 3 is a layer that exhibits characteristics required for the developing roller, such as compression set, surface hardness and the like, and is formed so as to cover an outer periphery of the shaft. A conductivity-imparting agent is blended in the elastic layer to control the electrical resistance value, and examples of the conductivity-imparting agent include conductive carbon such as carbon, resin-coated carbon, and graphite; metal oxide particles such as zinc oxide, tin oxide, and titanium oxide; metal particles such as nickel, copper, and silver; conductive polymers such as polyacetylene and polypyrrole; ionic conductive agents such as lithium-based, potassium-based, fluoro-based, sulfonyl-based, quaternary ammonium-based, and carboxylic acid-based ionic conductive agents, and the like.

The elastic layer is required to have small compression set and high repairability against deformation. As the elastic layer, for example, thermosetting polyurethane, ethylene-propylene-diene rubber (EPDM), epichlorohydrin rubber (ECO), acrylonitrile-butadiene rubber (NBR), silicone rubber, fluororubber, natural rubber (NR), and the like can be used alone or in a mixture of two or more kinds. In particular, it is preferable to use thermosetting polyurethane having an excellent balance of performances as a main raw material. Additionally, the main raw material means accounting for 50% by weight or more of all the materials constituting the elastic layer.

The thermosetting polyurethane is not particularly limited, and a combination of general polyol and isocyanate can be used. In addition, as the polyol, polyether-based polyol, polyester-based polyol, polylactone-based polyol, polycarbonate-based polyol, and the like can be used alone or in a mixture of two or more kinds. In particular, trifunctional polyether-based polyol having a number average molecular weight of 2500 to 3500 is preferable because the trifunctional polyether-based polyol has low hardness and small compression set when it is made into urethane.

Examples of the polyether-based polyol include polyoxyalkylene polyol, polyoxytetramethylene glycol, a mixture thereof, and the like. The polyoxyalkylene polyol may be, for example, those obtained by a ring-opening addition reaction of alkylene oxide such as ethylene oxide, propylene oxide, 1,2-butylene oxide, 1,3-butylene oxide, styrene oxide, or the like using a compound having two or more active hydrogen-containing groups as a starting raw material.

Additionally, examples of the compound having two or more active hydrogen-containing groups include divalent alcohol such as ethylene glycol, diethylene glycol, propylene glycol, dipropylene glycol, neopentyl glycol, 1,4-butanediol, and 1,6-hexanediol; trihydric or higher hydric alcohol such as glycerin, trimethylolpropane, pentaerythritol, diglycerine, dextrose, sorbitol, and sucrose; polyphenol such as resorcinol, hydroquinone, and bisphenol A; polyamine such as ethylenediamine, tolylenediamine, 1,3-propanediamine, and isophoronediamine; alkanolamine such as diethanolamine and triethanolamine; modified products thereof, and the like, and these compounds can be used alone or in a mixture of two or more kinds.

As the polyester-based polyol, for example, those obtained by a condensation reaction of a dicarboxylic acid and a polyhydric alcohol can be adopted.

Additionally, examples of the dicarboxylic acid include saturated aliphatic dicarboxylic acids such as glutaric acid, adipic acid, pimelic acid, suberic acid, azelaic acid, and sebacic acid; saturated aliphatic dicarboxylic acids such as cyclohexanedicarboxylic acid; aromatic dicarboxylic acids such as phthalic acid, terephthalic acid, and isophthalic acid; unsaturated aliphatic dicarboxylic acids such as maleic acid, fumaric acid, and itaconic acid; halogen-containing dicarboxylic acids such as tetrabromophthalic acid; ester-forming derivatives thereof, acid anhydrides thereof, and the like, and these compounds can be used alone or in a mixture of two or more kinds.

Examples of the polyhydric alcohol constituting polyester-based polyol together with the dicarboxylic acid include ethylene glycol, diethylene glycol, propylene glycol, 1,4-butanediol, 1,5-pentanediol, 3-methyl-1,5-pentanediol, 1-6-hexanediol, trimethylolpropane, glycerin, pentaerythritol, diglycerin, dextrose, sorbitol, and the like, and these compounds can be used alone or in a mixture of two or more kinds.

The isocyanate is not particularly limited and may be, for example, aromatic polyisocyanate such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylenediocyanate, polymethylene polyphenylene polyisocyanate, tolidine diisocyanate (TODI), and 1,5-naphthalene diisocyanate (NDI); aliphatic polyisocyanate such as hexamethylene diisocyanate (HDI), trimethylhexamethylene diisocyanate (TMHDI), lysine diisocyanate, norbornene diisocyanate methyl (NBDI), xylylene diisocyanate (XDI), and tetramethylxylylene diisocyanate (TMXDI); alicyclic polyisocyanate such as transcyclohexane-1,4-diisocyanate, isophorone diisocyanate (IPDI), hydrogenated XDI (H6XDI), and hydrogenated MDI (H12MDI); carbodiimide-modified polyisocyanate of each polyisocyanate described above or isocyanurate-modified polyisocyanate thereof, and the like, and these compounds can be used alone or in a mixture of two or more kinds.

In addition, additives such as a filler, a stabilizer, a reactive acceleration catalyst, a softening agent, a processing aid, a mold release agent, an antifoaming agent, a flame retardant, a vulcanizing agent, a vulcanization accelerator, and the like can be blended in the elastic layer if necessary.

(About Coat Layer)

The coat layer 4 is a coating layer formed on the elastic layer 3 by a method such as dip coating, roll coating, spray coating, or the like, and is constituted by a binder resin and additives such as a conductive agent and the like.

As the binder resin, an acrylic resin, an acrylic/fluorine mixed resin, an acrylic urethane resin, a lactone-modified acrylic urethane resin, an acrylic-modified silicone resin, a thermoplastic urethane resin, a phenol resin, a cellulose resin, a melamine resin, an alkyd resin, and the like can be used alone or in a mixture of two or more kinds. Among these resins, a mixture of an acrylic resin (for example, manufactured by Nippon Shokubai Co., Ltd., product name: NK380) and an acrylic/fluorine mixed resin (for example, manufactured by DIC Corporation, product name: TR101) is preferable because toner filming is unlikely to occur. The solid content weight ratio of the acrylic resin and the acrylic/fluorine mixed resin is preferably a ratio of 10 to 90:90 to 10.

The conductive agent may be conductive carbon such as carbon, resin-coated carbon, and graphite; metal oxide particles such as zinc oxide, tin oxide, and titanium oxide; metal particles such as nickel, copper, and silver; conductive polymers such as polyacetylene and polypyrrole; ionic conductive agents such as lithium-based, potassium-based, fluoro-based, sulfonyl-based, quaternary ammonium-based, and carboxylic acid-based ionic conductive agents, and the like, which can be used without particular limitation. The adding amount of the conductive agent may be adjusted according to the volume resistivity required for the coat layer. The conductive agent can be used alone or in a mixture of two or more kinds. Among these conductive agents, carbon black is preferable because it exhibits stable conductivity against environmental changes.

(About End Portion Coat Layer)

The end portion coat layers 5 are formed on the outermost surfaces on the two axial end portions of the developing roller 1, that is, parts that rub against the toner sealing material when the developing roller 1 is accommodated in the cartridge. The end portion coat layer 5 has higher hardness and lower friction than the coat layer 4, and is excellent in wear resistance. The developing roller is incorporated into the cartridge in a state in which the two axial end portions are strongly pressed against the toner sealing material and are in close contact with the toner sealing material in order that the toner does not leak into the electrophotographic device. When the developing roller rotates, a frictional force stronger than a frictional force applied to the central part of the elastic layer is applied to the two axial end portions which are in close contact with the toner sealing material. By forming the end portion coat layer having excellent wear resistance to protect the two axial end portions, the life of the developing roller can be extended. Examples of the method for forming the end portion coat layer include dip coating, spray coating and the like, and spray coating is preferable. The reason is that in other coating methods, the solvent in the end portion coat layer coating liquid may dissolve the coat layer, which is an object to be coated.

The end portion coat layers are formed on the two axial end portions over a width of 2 to 15 mm, more preferably 5 to 10 mm. If the width of the end portion coat layer is narrower than 2 mm, the end portion protection function is not sufficient, and even if the end portion coat layer is formed to be wider than 15 mm, the end portion protection function is not further improved. The material for forming the end portion coat layer is not particularly limited as long as it is a material having excellent wear resistance and capable of exhibiting the end portion protection function, and isocyanate, thermoplastic urethane, fluororesin, and the like can be used. Among these materials, either one or both of isocyanate and thermoplastic urethane are preferable. The end portion coat layer containing either one or both of isocyanate and thermoplastic urethane has high affinity with the materials for forming the elastic layer and the coat layer and are firmly adhered, and thus the end portion coat layer is difficult to be peeled off. Each of the isocyanate and the thermoplastic urethane may be a combination of two or more kinds. In addition, a silicone-based lubricant and the like can be blended in the end portion coat layer.

In the developing roller of the present invention, the end portion coat layer contains a conductive material. The conductive material may be conductive carbon such as carbon, resin-coated carbon, and graphite; metal oxide particles such as zinc oxide, tin oxide, and titanium oxide; metal particles such as nickel, copper, and silver; conductive polymers such as polyacetylene and polypyrrole; ionic conductive agents such as lithium-based, potassium-based, fluoro-based, sulfonyl-based, quaternary ammonium-based, and carboxylic acid-based ionic conductive agents, and the like. Among these conductive materials, the conductive polymer having solubility or the ionic conductive agent is preferable because nozzle clogging and the like are unlikely to occur when the end portion coat layer is formed by spray coating, and the ionic conductive agent is more preferable because the coating liquid is unlikely to have high viscosity and has excellent handleability.

The adding amount of the conductive material may be adjusted within a range in which the wear resistance of the end portion coat layer does not decrease. However, it is preferable that a ratio (Ω1/Ω2) of a resistance value Ω1 at an axial central part of the end portion coat layer to a resistance value Ω2 at an axial central part of the coat layer is 1.6 or less. In addition, it is preferable that an absolute value of the difference between Ω1 and Ω2 (|Ω1−Ω2|) is 0.7 GΩ or less. By making Ω1 and Ω2 satisfy the above condition, the resistance value of the end portion coat layer and the resistance value of the coat layer become close to each other, the increase in the electrical resistance value of a part adjacent to the part where the end portion coating treatment of the developing roller at the time of the arrangement of the end portion coat layer by coating and the like is performed (the part corresponding to a nonprinting area of the printing paper) can be suppressed, and scumming derived from toner adhesion to this part can be prevented. The ratio of Ω1 to Ω2 (Ω1/Ω2) is more preferably 1.4 or less, and further preferably 1.2 or less. In addition, the absolute value of the difference between Ω1 and Ω2 (|Ω1−Ω2|) is more preferably 0.5 GΩ or less, and further preferably 0.3 GΩ or less. Additionally, in the specification, the resistance value means a value measured by the method of the following examples.

EXAMPLES

Conductive carbon (#45L, manufactured by Mitsubishi Chemical Corporation) was dispersed by a roll into trifunctional polyether-based polyol having a number average molecular weight of 3000 (Preminol 53003, manufactured by AGC Inc.) which serves as a polyol. Furthermore, a dimethyl fatty acid monocarboxylic acid salt (UL28, manufactured by Katsuzai-Chemical Co., Ltd.) was mixed as a reactive acceleration catalyst, and a main agent was made.

m-xylene diisocyanate (Takenate 500, manufactured by Mitsui Chemicals, Inc.) was mixed as the isocyanate to obtain a resin composition.

The resin composition was poured into a mold set around the shaft, and the entire mold was heated to cure the resin composition in the mold, then the resin composition was demolded and further heated to perform post-crosslinking of polyurethane elastomer, and thereby an elastic layer consisting of polyurethane elastomer and covering the outer circumference of the shaft was formed.

to the end portion coating material (solid content), respectively. In addition, the one in which no conductive material was added to the end portion coat layer was used as a comparative example. Note that, normally, the end portion coat layer is not arranged up to the part corresponding to the printing paper, but in the examples, the end portion coating was performed up to the part corresponding to the nonprinting area of the printing paper in order that the scumming was likely to occur in the nonprinting area.

TABLE 1

| | Example A-1 | Example A-2 | Example A-3 | Example B-1 | Example B-2 | Example B-3 |
|---|---|---|---|---|---|---|
| Dehydrated MEK | 282 | 282 | 282 | 282 | 282 | 282 |
| Acrylic polymer | 3.60 | 3.60 | 3.60 | 3.60 | 3.60 | 3.60 |
| Urethane hardener | 14.25 | 14.25 | 14.25 | 14.25 | 14.25 | 14.25 |
| Lithium-based ionic conductive agent | 0.150 | 0.302 | 0.611 | — | — | — |
| Potassium-based ionic conductive agent | — | — | — | 0.075 | 0.151 | 0.306 |
| Carbon-based conductive agent | — | — | — | — | — | — |

| | Example C-1 | Example C-2 | Example C-3 | Comparative example |
|---|---|---|---|---|
| Dehydrated MEK | 282 | 282 | 282 | 282 |
| Acrylic polymer | 3.60 | 3.60 | 3.60 | 3.60 |
| Urethane hardener | 14.25 | 14.25 | 14.25 | 14.25 |
| Lithium-based ionic conductive agent | — | — | — | — |
| Potassium-based ionic conductive agent | — | — | — | — |
| Carbon-based conductive agent | 1.54 | 3.19 | 5.54 | — |

The elastic layer was subjected to a first polishing step by dry plunge polishing using a #150 green carborundum grindstone (manufactured by Teiken Corporation) and a second polishing step by wet tape polishing using #1500 alumina abrasive grains (manufactured by Sankyo Rikagaku Co., Ltd.) to form an inverted crown shape.

An acrylic resin (NK380, manufactured by Nippon Shokubai Co., Ltd.) and an acrylic/fluorine mixed resin (TR101, DIC Corporation) were mixed to make a binder resin.

An ionic conductive agent (Sankonol MEK-50R, manufactured by Sanko Chemical Industry Co., Ltd.) and a carbon dispersion liquid (SS-01-942, manufactured by Dainichiseika Color & Chemicals Mfg. Co., Ltd.) were blended in the binder resin to obtain a binder resin composition.

The binder resin composition was applied onto the elastic layer by dip coating to form a coat layer.

End portion coat layers having a coat width of 14 mm were arranged on the two axial end portions of the obtained roller by spray coating. The composition (parts by weight) of the end portion coat layer is shown in Table 1.

In Examples A-1 to A-3, a lithium-based ionic conductive agent was added in a manner that the ionic conductive agent (solid content) was 0.5, 1.0, and 2.0 wt % with respect to the end portion coating material (solid content), respectively, and in Examples B-1 to B-3, a potassium-based ionic conductive agent was added in the same manner as in Examples A-1 to A-3. In Examples C-1 to C-3, a carbon dispersion liquid was added in a manner that the carbon black (solid content) was 3.0, 6.0, and 9.0 wt % with respect Dehydrated MEK: First-class reagent, manufactured by Dan Chemical Co., Ltd.

Acrylic polymer: Aron GS30, manufactured by Toagosei Co., Ltd.

Urethane hardener: Sumidur 44V20, manufactured by Sumitomo Bayer Urethane Co., Ltd.

Lithium-based ionic conductive agent: Sankonol-MEK 50R, manufactured by Sanko Chemical Industry Co., Ltd.

Potassium-based ionic conductive agent: Potassium Trifluoromethanesulfonate (first-class reagent), manufactured by Tokyo Chemical Industry Co., Ltd.

Carbon-based conductive agent: Seika Black SS-01-942, manufactured by Dainichiseika Color & Chemicals Mfg. Co., Ltd.

The following measurements were performed on the obtained developing roller. The results are shown in Table 2.

Electrical Resistance Value

Figure 2:
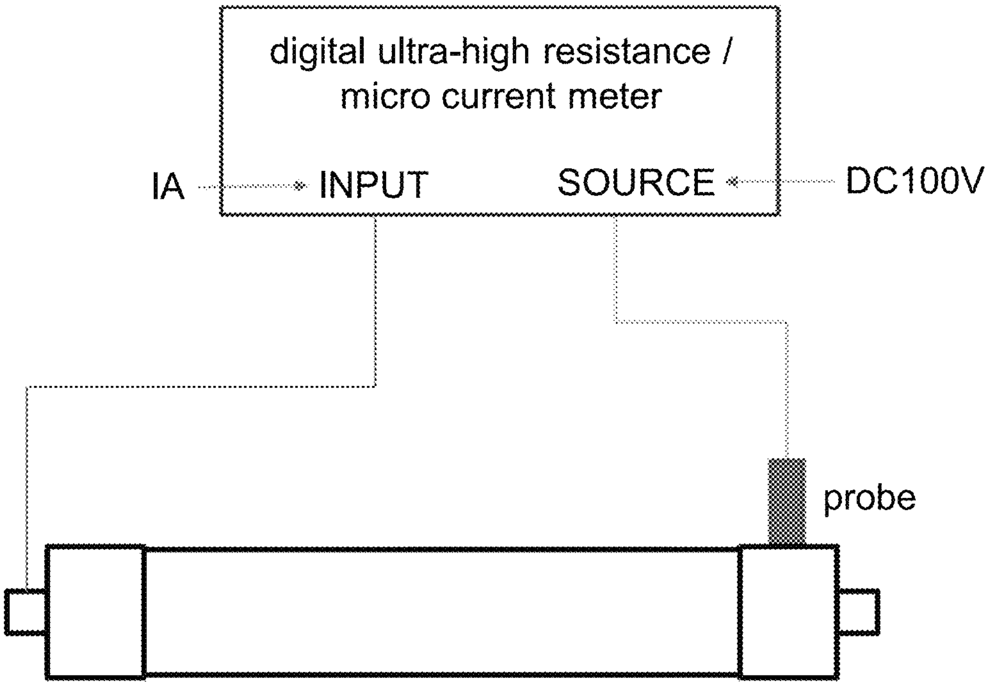
FIG. 2 is a schematic diagram of measurement of an electrical resistance value.

A schematic diagram of the measurement is shown in FIG. 2.

One probe was connected to the shaft of the developing roller, and the other probe (having a width of 3 mm) was connected to a part where the electrical resistance value of the developing roller surface was to be measured (the axial central part of the end portion coat layer or the axial central part of the coat layer), and the other end of each probe was connected to a digital ultra-high resistance/micro current meter (5450, manufactured by ADC Corporation). DC 100 V was applied from the current meter, and the resistance value R of the target part was calculated from the current I.

The roller was rotated at 20 rpm, and data for four laps of the roller at a sampling interval of 60 ms was collected, and the average value of three laps excluding the first lap was taken as the electrical resistance value.

Hardness

The hardness of the surface hardness (MD1 hardness) of the developing roller was measured using a micro rubber hardness tester (manufactured by Kobunshi Keiki Co., Ltd., product name: MD-1 type A). In the measurement, each measurement point was measured at three points in the circumferential direction in an environment of a temperature of 23° C. and a humidity of 50% RH.

Dynamic Friction Coefficient

Figure 3:
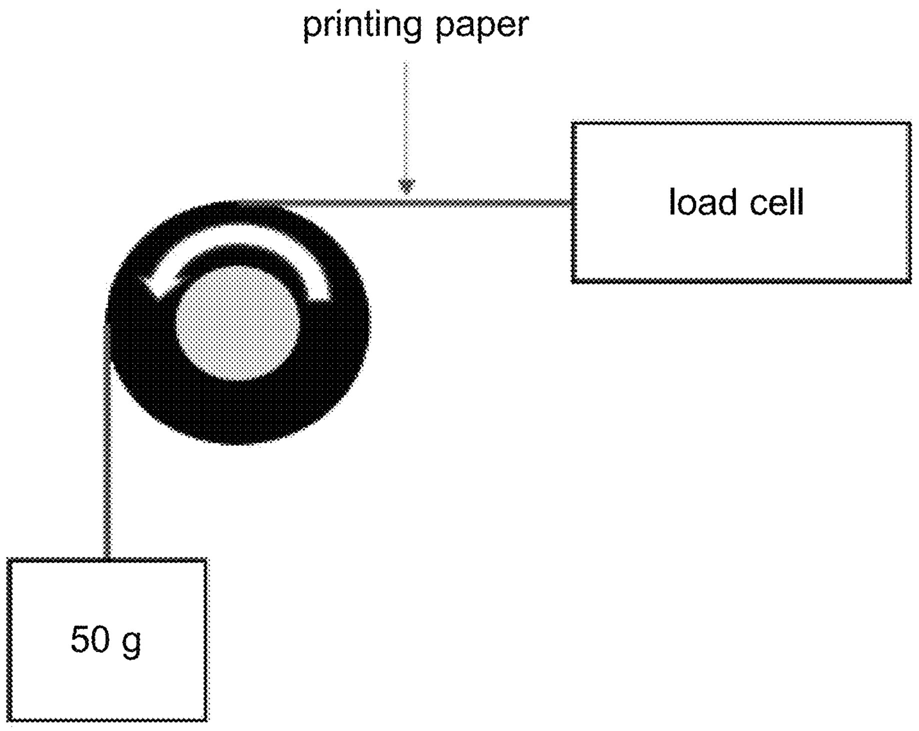
FIG. 3 is a schematic diagram of measurement of a dynamic friction coefficient.

A schematic diagram of the measurement is shown in FIG. 3.

One end of printing paper cut to a length of 210 mm and a width of 10 mm was attached to a probe of a load cell (LTS-2KA, manufactured by Kyowa Electronic Instruments Co., Ltd.), and a weight of 50 g was attached to the other end of the printing paper. The weight was suspended via the developing roller, and the roller was rotated at 40 rpm. The dynamic friction coefficient was calculated from the load of the load cell at this time based on Euler's belt theory formula.

Scumming

After each developing roller was incorporated into an electrophotographic device (SP6410, manufactured by Ricoh Co., Ltd.) and 40 sheets of A4 printing paper (PPC Paper High White, manufactured by Otsuka Corporation) were continuously printed in a manner that the entire printing area became black, the difference in black density between the nonprinting area (the part where scumming occurred) of the 40th sheet in the width direction and the unprinted printing paper was measured by a Macbeth densitometer (RD918, manufactured by GretagMacbeth).

coat layer part, the part adjacent to the end portion coat layer, and the longitudinal central part (the coat layer part) of the developing roller become close.

In Examples A-1 to A-3, the resistance value was changed according to the adding amount of the conductive material, but in Examples B-1 to B-3 and C-1 to C-3, the resistance value was almost constant regardless of the adding amount of the conductive material. From this fact, it was confirmed that it is easy for the lithium-based ionic conductive agent blended in Examples A-1 to A-3 to adjust the resistance value.

In Example A, the resistance value was changed according to the adding amount of the conductive material, but in Examples B and C, the resistance value was almost constant regardless of the adding amount of the conductive material. From this fact, it was confirmed that it is easy for the lithium-based ionic conductive agent blended in Example A to adjust the resistance value.

What is claimed is:

1. A developing roller having two end portions and a central portion disposed between the two end portions in an extension direction of an axial, comprising an elastic layer, a coat layer formed on the elastic layer, and end portion coat layers only formed on outermost surfaces on the two end portions, wherein the end portion coat layer comprises a conductive material, a ratio (Ω1/Ω2) of a resistance value Ω1 at an axial central part of the end portion coat layer to a resistance value Ω2 at an axial central part of the coat layer is 1.6 or less, and an absolute value (|Ω1−Ω2|) of a difference between the resistance value Ω1 at the axial central part of the end portion coat layer and the resistance value Ω2 at the axial central part of the coat layer is 0.7 GΩ or less.

TABLE 2

| | Electrical resistance value (GΩ) | | | | Dynamic friction coefficient | | Hardness | | |
|---|---|---|---|---|---|---|---|---|---|
| | Ω1 End portion coat layer center | Ω2 Coat layer center | Ω1/Ω2 | \|Ω1-Ω2\| (GΩ) | End portion coat layer center | Coat layer center | End portion coat layer center | Coat layer center | Scumming Difference in black density |
| Example A-1 | 0.932 | 0.804 | 1.2 | 0.128 | 0.30 | 2.07 | 53.9 | 52.0 | 0.01 |
| Example A-2 | 0.724 | 0.762 | 1.0 | 0.038 | 0.79 | 1.94 | 54.3 | 51.9 | 0.01 |
| Example A-3 | 0.395 | 0.751 | 0.5 | 0.356 | 0.55 | 1.94 | 53.4 | 52.0 | 0.00 |
| Example B-1 | 1.157 | 0.796 | 1.5 | 0.361 | 0.58 | 1.92 | 53.6 | 52.1 | 0.01 |
| Example B-2 | 1.072 | 0.768 | 1.4 | 0.304 | 0.50 | 1.97 | 54.3 | 52.0 | 0.02 |
| Example B-3 | 1.151 | 0.769 | 1.5 | 0.382 | 0.57 | 1.98 | 54.7 | 52.1 | 0.01 |
| Example C-1 | 1.304 | 0.822 | 1.6 | 0.482 | 0.42 | 1.92 | 53.5 | 52.2 | 0.00 |
| Example C-2 | 1.121 | 0.797 | 1.4 | 0.324 | 0.31 | 1.91 | 52.9 | 52.1 | 0.01 |
| Example C-3 | 1.216 | 0.784 | 1.6 | 0.432 | 0.34 | 1.93 | 52.8 | 52.0 | 0.00 |
| Comparative example | 1.691 | 0.791 | 2.1 | 0.900 | 0.47 | 1.96 | 53.9 | 52.0 | 0.08 |

In the developing roller of the comparative example, the difference in black density was as large as 0.08, and scumming was observed in the nonprinting area after the printing of 40 sheets.

On the other hand, in the developing roller of the present invention to which the conductive material was added, the difference in black density was small regardless of the type and the density of the conductive agent, and almost no scumming was observed. The reason is that the end portion coat layer contains the conductive material, and thereby the values of the electrical resistance value of the end portion

2. The developing roller according to claim 1, wherein the conductive material is an ionic conductive agent.

3. The developing roller according to claim 1, wherein the elastic layer uses thermosetting polyurethane as a main raw material.

4. An electrophotographic device, comprising the developing roller according to claim 1.

5. The developing roller according to claim 2, wherein the elastic layer uses thermosetting polyurethane as a main raw material.

6. An electrophotographic device, comprising the developing roller according to claim 2.

7. An electrophotographic device, comprising the developing roller according to claim 3.

* * * * *